Jan. 26, 1960
C. T. GRUNER
2,922,488
FILTER DEVICE
Filed Aug. 22, 1956
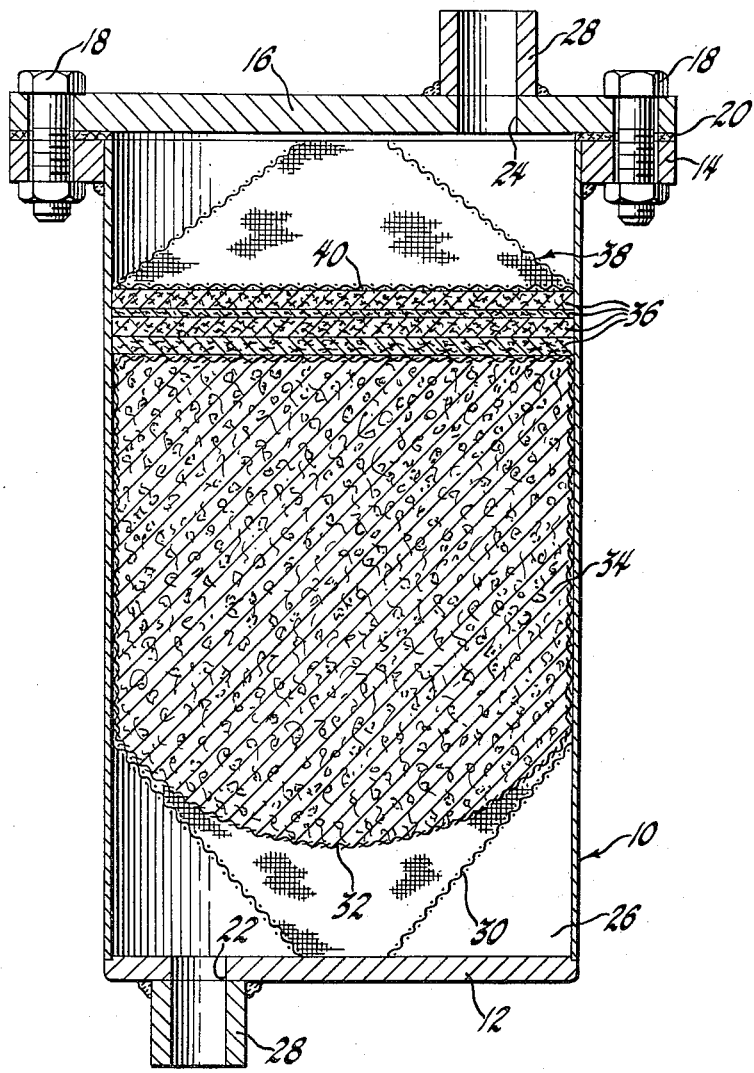
Inventor
Charles T. Gruner
By
L. D. Burch
Attorney United States Patent Office 2,922,488
Patented Jan. 26, 1960

2,922,488

FILTER DEVICE

Charles T. Gruner, Detroit, Mich., assignor to General Motors Corporation, Detroit, Mich., a corporation of Delaware Application August 22, 1956, Serial No. 606,793

1 Claim. (Cl. 183—4.3)

This invention relates to a filtering device and more particularly to an air filter device for use in removing entrained vapors and other impurities from air lines connected to pressure gages or the like. This application is a continuation-in-part of my co-pending patent application Serial No. 435,833, now abandoned, which was filed on June 10, 1954.

A variety of different types of filtering materials have been used in the past for drying, cleaning and filtering air and other gaseous fluids. Of course, in filter devices which are designed primarily for removing entrained liquids from gaseous fluids it is desirable to use a highly adsorbent filtering material. If such materials are to gain any wide commercial acceptance, they must either have an extremely long service life or be very inexpensive. In the former category are those filtering materials which are adapted to readily give up liquid or other impurities removed from the air by some regenerative process without detrimentally affecting the chemical or physical structure of the material, thereby permitting it to be reused a number of times.

A principal object of the present invention is to provide a convenient method of efficiently removing entrained oil and water vapor from air lines. A further object of the invention is to provide a filter unit in which the filtering material is inexpensive and can be easily replaced after its efficiency begins to diminish. A still further object of the present invention is to provide a filter and drying device which may be readily placed in an air line and which contains a filtering material which can be regenerated and reused without difficulty.

These and other objects are attained in accordance with my invention with a filter unit having as the principal filtering material an exploded or expanded alkaline aluminum silicate such as exploded volcanic ash or lava. This material is preferably used in loose, granulated form, but acceptable results are also produced when it is employed in a molded or molded and sintered state. In either event air or other gaseous fluid can be easily directed through the filtering material, which adsorbs vapors and entraps liquid particles, as well as separates other foreign matter from the carrier gas. This filtering material is not only readily available and inexpensive, but it operates effectively as an adsorbent material for a long period of time. Moreover, as will hereinafter be more fully explained, it can be readily rejuvenated without adversely affecting its future utility.

It will be understood that the words "gas" and "gaseous fluid" are used herein as including vapors and gases containing vapors from which it is desirable to separate foreign matter such as water or other filterable vapors, liquids and solids.

A canister-type container for the volcanic lava ash is preferably used since this type of filter can be easily installed in air lines and quickly removed and replaced. In order to prevent granular volcanic ash with its entrapped impurities from entering the air stream, a plurality of pads formed of felt or other suitable material are positioned adjacent the downstream end of the filtering material. A screen or perforated disc is preferably employed to properly retain the pads in place against the filtering material.

Other objects and advantages of the present invention will more fully appear from the following detailed description of a preferred embodiment thereof, reference being made to the accompanying drawing showing a sectional side view of a canister-type filtering and drying device embodying the invention.

Referring more particularly to the drawing, a container or canister 10, preferably of cylindrical shape, has a lower end wall 12. The upper end of this canister is shown as provided with radially extending flanges 14 to which a cover plate or top wall 16 of the canister is secured by means of bolt and nut assemblies 18. A gasket of rubber or other suitable material is located between the flange 14 and the cover plate 16 to form an airtight closure at the junction of these parts. An inlet opening 22 extends through the bottom wall 12, while the cover plate is provided with an outlet opening 24. These openings, each of which communicates directly with the chamber 26 within the canister, are preferably formed off center rather than being in axial alignment in order to provide more effective filtration action. Pipe connections or other coupling members 28 are attached to each of the bottom walls 12 and the cover plate 16 over the openings 22 and 24 by welding or other appropriate means, thus permitting the canister to be readily connected in an air line or the like.

In the embodiment of the invention shown in the drawing a truncated conical screen or baffle 30 is positioned in the lower end of the canister 10 so that its tapered end rests against the bottom wall 12 and its flared end extends upwardly and radially into contact with the side walls of the canister. This screen, which is preferably formed of brass or other corrosion-resistant metal, provides an annular passageway near the bottom edge of the canister which serves to distribute the incoming air equally within the lower end of the chamber 26. Disposed over the screen 30 is a bag 32 made of multi-layer cheese cloth or other porous material containing loose, granular filtering and drying material 34 of the type hereinafter described. A series of layers 36 of felt or other fibrous material, such as glass fiber cloth, are located within the canister over the top of the bag 32 which extends upwardly within a short distance of the cover plate 16. These felt layers or pads prevent dust or extremely fine dust-like particles of the filter material 34 from entering the purified air stream. Positioned between the felt layers and the cover plate is a second truncated conical screen or baffle 38 similar to the screen 30. A perforated brass disc or screen 40, which may be integral with the conical baffle 38, is disposed against the top of the felt pads 36. In this manner the pads are retained securely in place, and air moving rapidly through the chamber 26 cannot force any of the granular filtering material out of the opening 24 and into the dry air stream.

It will be seen that the screens 30 and 38 adjacent the ends of the canister retain the bag of filter material near the center of the canister and away from the inlet and outlet openings. The incoming air which enters the opening 22 thus is distributed more or less uniformly around the lower end of the filter bag 32 before it passes through the granular filter material 34. Since the filter bag extends throughout the cross-section of the canister, the air must all pass through the filtering material. Vapors, liquid particles and other foreign matter thus are very effectively entrapped within the filter material. After passing through the contents of the bag, the dry air travels through the felt pads 36 and re-enters the air line through the outlet opening 24.

In accordance with the present invention the filter material employed is an alkaline aluminum silicate, preferably having an appreciable alkali oxide content. Expanded volcanic lava ash, such as exploded perlite or pumicite, has been found to provide exceptional filtration and drying action for moist air streams. This results from the fact that this exploded lava ash is capable of adsorbing moisture in amounts as large as six times its own weight. The perlite which is mined in Nevada has proved to be highly successful although, of course, the invention is not limited to lava found in that area. On analysis, the filtering material employed is found to contain silica and alumina as its major constituents, and these oxides are necessary in order to provide the material with high water and oil adsorption properties. Specifically, I have found that for the special purpose of drying and filtering air containing entrained water and/or oil an exploded volcanic lava ash having the following analysis provides outstanding results, the figures listed being in percentages by weight.

|  | Percent |
| --- | --- |
| $SiO_2$ | 66–76 |
| $Al_2O_3$ | 10–16 |
| $K_2O$ | 2.5–6 |
| $Na_2O$ | 1.5–3.5 |
| $H_2O$ | 0–7 |
| $Fe_2O_3$ | 0.2–3 |
| $CaO$ | 0.5–2 |

Complete chemical analysis also shows that this material normally contains small amounts, generally less than 1% each, of FeO, MgO, $TiO_2$, $P_2O_5$ and MnO. Of course, it is desirable to have an appreciable total water content, usually 2% to 6%, in the volcanic lava ash before it is expanded in order to properly "explode" the material. As used in the expanded state in accordance with the present invention, however, the water content is not critical.

While the size of the expanded volcanic lava ash particles may vary appreciably, it is essential that a high percentage of these particles be of fairly small size. Particles as large as ¼ inch diameter are useful, but these particles should be mixed with finer materials since the latter have a greater liquid adsorption capacity per unit weight. In general, the particle size may range from the aforementioned large sizes to 350 mesh and, in some cases, even finer.

Although the expanded volcanic lava ash filtering material has been described above as being used in loose, granular form, it may also be employed as a porous molded or molded and sintered product. Thus a filter cartridge may be compacted or briquetted to proper shape and thereafter sintered by a process similar to that employed in powder metallurgy. Whether used in the loose, granular form or in the porous sintered form, this material will provide a gaseous fluid filtering medium having a sufficiently large surface to volume area to provide a high rate of water adsorption. There is reason to believe that this high rate results from the fact that both adsorption and absorption mechanisms are simultaneously involved in the removal of water from air by means of the filter and drying device hereinbefore described.

The filtering material expands as it continues to adsorb and/or absorb water and other vapors during operation, eventually decreasing the rate of air flow through the canister. However, the permeability of the expanded volcanic lava is so great prior to the time it contains a high percentage of entrapped liquid that it normally does not offer any appreciable resistance to the air flow. After the filter material has been finally saturated, it may be easily replaced or regenerated by heating to drive off entrapped liquid.

When this device is connected in an air line, such as one used for supplying air to air pressure gages or the like, it will operate effectively without the necessity of any attention for extended periods of time. Hence it can be successfully employed in conjunction with the operation of back pressure differential gages, plug gages, etc. In the case of air gages, it is particularly important to remove entrained moisture and oil particles, and the filter described and claimed herein thus serves to appreciably prolong the life and efficiency of such gages. As indicated above, however, since the filter will remove dust and other foreign particles from air, as well as dry the air, it may be beneficially used in many other applications. For example, I have found that this filter material is also useful in removing tars, hydrocarbons and products of combustion from gaseous fluid streams.

While the present invention has been described by means of certain specific examples, it is to be understood that the scope of the invention is not to be limited thereby except as defined in the following claim.

I claim:

A drying and filtering unit for connection in an air line and the like, said unit comprising a canister having an air inlet opening and an air outlet opening, a readily replaceable filter cartridge located within said canister between said openings, said cartridge contacting side walls of said canister, a porous mass of exploded volcanic lava ash within said cartridge, a pair of truncated conical baffle screens located within said canister and spacing said cartridge from end walls of said canister, wall portions of said screens being spaced from said cartridge, one of said baffle screens being disposed between said cartridge and said outlet opening, the other of said baffle screens being disposed between said cartridge and said inlet opening, and a plurality of fibrous pads located in said canister between said cartridge and the baffle screen nearer said outlet opening, said pads contacting said side walls of said canister, said cartridge and said pads being adapted to filter air flowing through said canister and to remove moisture and other foreign element therefrom.

References Cited in the file of this patent

UNITED STATES PATENTS

| 1,651,797 | Astrom | Dec. 6, 1927 |
| 1,866,659 | Litle | July 12, 1932 |
| 2,593,132 | Gannon | Apr. 15, 1952 |
| 2,768,144 | Sundback | Oct. 23, 1956 |

OTHER REFERENCES

"Nonmetallic Minerals," by Ladoo and Myers, 2nd edition, McGraw-Hill Book Co., New York, page 378.